United States Patent [19]

Epp et al.

[11] Patent Number: 4,848,849
[45] Date of Patent: Jul. 18, 1989

[54] ACCELERATION APPARATUS FOR CONNECTION WITH A PILOT OPERATED COMPRESSED-AIR BRAKE

[75] Inventors: Niklaus Epp; Pius Fischer, both of Rümlang; Heinz Deutsch, Dübendorf, all of Switzerland

[73] Assignee: Werkzeugmaschinenfabrik Oerlikon-Bührle AG, Zürich, Switzerland

[21] Appl. No.: 310,313

[22] Filed: Feb. 14, 1989

[30] Foreign Application Priority Data

Feb. 17, 1988 [CH] Switzerland ............... 583/88

[51] Int. Cl.⁴ .................. B60T 17/04; B60T 15/42
[52] U.S. Cl. ..................... 303/82; 303/37; 303/38; 303/69
[58] Field of Search ............ 303/33, 34, 35, 36, 303/37, 38, 69, 68, 81, 82, 86, 83

[56] References Cited

U.S. PATENT DOCUMENTS

| | | | |
|---|---|---|---|
| 4,108,501 | 8/1978 | Hintner et al. | 303/82 |
| 4,135,768 | 1/1979 | Huber | 303/82 X |
| 4,139,239 | 2/1979 | Stäuble et al. | 303/82 |
| 4,226,482 | 10/1980 | Stäuble et al. | 303/37 X |
| 4,449,759 | 5/1984 | Eder | 303/38 |
| 4,480,875 | 11/1984 | Huber | 303/38 |
| 4,536,040 | 8/1985 | Eder | 303/37 |
| 4,552,411 | 11/1985 | Hintner | 303/37 |
| 4,592,598 | 6/1986 | Hintner | 303/37 |

FOREIGN PATENT DOCUMENTS 1263808 3/1968 Fed. Rep. of Germany .
62619 6/1955 France .
2165928 8/1973 France .

Primary Examiner—Douglas C. Butler
Attorney, Agent, or Firm—Werner W. Kleeman

[57] ABSTRACT

The acceleration apparatus for connection with a pilot operated compressed-air brake comprises a tap-off valve which vents the main air line or conduit at the beginning of the braking procedure. This tap-off valve is opened by an actuator or actuating mechanism via a disengageable intermediary member. By employing a rotationally symmetrical plunger or push rod which is pivoted into the operative position thereof by a spring and deflected by an interrupter piston, the construction of the disengageable intermediary member can be substantially simplified. The plunger or push rod possesses at the one end thereof a cam or pin and a substantially conical surface.

3 Claims, 1 Drawing Sheet

ACCELERATION APPARATUS FOR CONNECTION WITH A PILOT OPERATED COMPRESSED-AIR BRAKE

BACKGROUND OF THE INVENTION

The present invention broadly relates to braking systems and, more specifically pertains to a new and improved construction of an acceleration apparatus for connection with a pilot operated compressed-air brake, particularly for railroad vehicles.

Generally speaking, the apparatus of the present invention comprises a tap-off valve, an actuator or actuating mechanism acting via a disengageable intermediary member for opening the tap-off valve, and a chamber connected to a main air line or conduit via the tap-off valve and vented by means of a throttle bore.

In an acceleration apparatus of this type known to the art, a two-armed or double-arm lever serving as the disengageable intermediary member is pivotably linked or hinged at the actuator or actuating mechanism, the upper arm of the two-armed or double-arm lever being forked. One fork tine cooperates with a guide rod or bar of the tap-off valve, while the other fork tine cooperates with an interrupter cam. The two-armed or double-arm lever is pivotable about a bolt. A spring supported at the lower arm of the two-armed or double-arm lever is biased to pivot the latter into the engaged position thereof. The two-armed or double-arm lever is disengaged by the interrupter piston.

This two-armed or double-arm lever in the known acceleration apparatus is relatively difficult to fabricate and complicated to assemble or incorporate and should therefore be replaced by a disengageable intermediary member or connecting link which is simple to fabricate and easier to install.

SUMMARY OF THE INVENTION

Therefore with the foregoing in mind it is a primary object of the present invention to provide a new and improved acceleration apparatus for connection with a pilot operated compressed-air brake, which apparatus does not suffer from the aforementioned drawbacks and shortcomings of the prior art constructions.

Another and more specific object of the present invention aims at providing a new and improved acceleration apparatus for connection with a pilot operated compressed-air brake, such acceleration apparatus having a disengageable intermediary member which is simple in construction and design, economical to manufacture, relatively uncomplicated to install and highly reliable in operation.

Now in order to implement these and still further objects of the invention, which will become more readily apparent as the description proceeds, the acceleration apparatus for connection with a pilot operated compressed-air brake as contemplated by the present invention, among other things, is manifested by the features that the disengageable intermediary member is constructed as a rotationally symmetrical plunger or push rod and held in the operative position thereof by a spring or resilient element or the like.

In a preferred construction of a simple embodiment of the invention, the rotationally or axially symmetrical plunger or push rod comprises at one end thereof a substantially ball-shaped or spherical curvature or rounding-off or rounded portion and bears against a corresponding ball socket or cup provided at the actuator or actuating mechanism. The rotationally symmetrical plunger or push rod advantageously comprises at the other end thereof a substantially conical surface above which or at the top of which a cam or pin projects. The guide rod or bar is located directly above this cam or pin or equivalent structure when the disengageable intermediary member is in the operative or engaged position thereof.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein.

DETAILED DESCRIPTION OF THE PREFERRED EMBODIMENTS

Figures 1, 2:
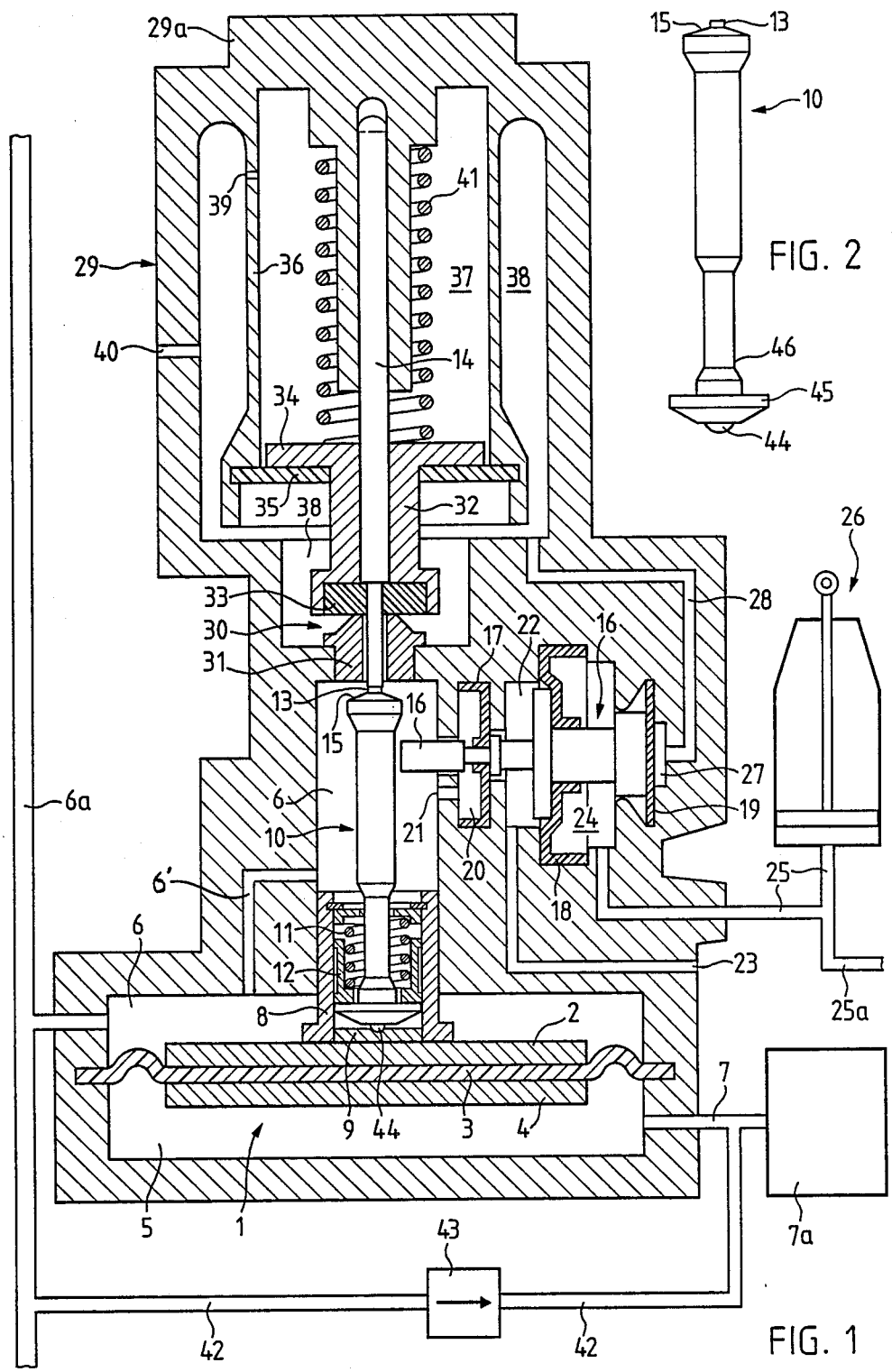
FIG. 1 shows an axial section through an exemplary embodiment of the acceleration apparatus constructed according to the present invention.
FIG. 2 shows, on an enlarged scale, a view of the plunger or push rod of the acceleration apparatus shown in FIG. 1.

Describing now the drawings, it is to be understood that to simplify the showing thereof, only enough of the construction of the exemplary embodiment of the acceleration apparatus for connection with a pilot operated compressed-air brake has been illustrated therein as is needed to enable one skilled in the art to readily understand the underlying principles and concepts of this invention. Turning now specifically to FIG. 1 of the drawings, the apparatus illustrated therein by way of example and not limitation will be seen to comprise an actuator or actuating mechanism 1 having a piston or piston member 2 at which a diaphragm or membrane 3 is secured. A plate-shaped part or portion 4 of the piston 2 is visible below or beneath the diaphragm or membrane 3. A substantially cylindrical space is subdivided by the diaphragm or membrane 3 into two chambers or compartments 5 and 6. The lower chamber or compartment 5 is connected via a line or conduit 7 with a control-air container 7a. The upper chamber or compartment 6 is connected to a main air line or conduit 6a. At one end face of the piston 2 there is fastened a sleeve or tube 8 within which a plunger or push rod 10 bears against a ball socket or cup 9. The upper chamber or compartment 6 is connected via a line or conduit 6' with an upper portion thereof which is located above the sleeve or tube 8. A spring 11 is biased to press the plunger or push rod 10 against the ball socket or cup 9 by means of a displaceable sleeve 12 and thus to hold or retain the plunger or push rod 10 in the vertical position thereof shown in FIG. 1. Above a cam or pin 13 (cf. FIG. 2) of this plunger or push rod 10 there is located a guide rod or bar 14 which is part of a tap-off valve 30 described hereinafter.

An interrupter piston or piston member 16 laterally bears against the plunger or push rod 10. The plunger or push rod 10 can be pivoted out of the region or range of the guide rod or bar 14 by means of the interrupter piston 16 as shall be hereinafter described in greater detail. Three diaphragms or membranes 17, 18 and 19 bear against the interrupter piston 16. To the left of the first diaphragm or membrane 17, as viewed or regarded in FIG. 1 of the drawings, a chamber 20 is connected via a bore 21 with the upper chamber or compartment 6 which, as already mentioned, is in flow connection or communication with the main air line or conduit 6a. A further chamber 22 located between the first diaphragm or membrane 17 and the second diaphragm or membrane 18 is connected via a line or conduit 23 with the outside or atmospheric air. Yet a further chamber 24 located between the second diaphragm or membrane 18 and the third diaphragm or membrane 19 is connected via a line or conduit 5 with a brake or braking cylinder 26.

To the right of the third diaphragm or membrane 19, as illustrated in FIG. 1 of the drawings, a chamber 27 is connected via a line or conduit 28 with a chamber 38 located in a housing 29 which will be hereinafter described. Between the housing 29 and the upper chamber or compartment 6 connected to the main air line or conduit 6a, there is provided the tap-off valve 30 which comprises a valve seat 31 and a valve body 32. At this valve seat 32 there is fastened a sealing washer or seal disc 33 which bears upon the valve seat 31 when the tap-off valve 30 is closed. The valve body 32 is connected to a piston or piston member 34 fixedly attached or seated on the guide rod or bar 14. A diaphragm or membrane 35 is fastened to the lower end of a cylinder 36 and bears against the piston 34. This cylinder 36 encircles or surrounds a chamber or compartment 37, projects into the housing 29 and is fastened at the top or upper end to the latter. The diaphragm or membrane 35 thus subdivides the housing 29 into the chamber or compartment 37 and a further chamber or compartment 38 which are connected to each other by means of throttling means 39. The outer chamber or compartment 38 is connected with the outside or atmospheric air via a throttle bore 40. A spring 41 which, on the one hand, is supported at the piston 34 and, on the other hand, at the cover or covering 29a of the housing 29, is biased to downwardly displace or push the piston 34 and thus press the valve body 32 against the valve seat 31 so that the tap-off valve 30 is closed.

The control air container 7a is connected with the main air line or conduit 6a via a line or conduit 42 in which a check valve 43 is provided. The brake or braking cylinder 26 is connected via a line or conduit 25a with a suitable main controlling member not particularly shown in the drawing.

According to FIG. 2, the plunger or push rod 10 comprises, as already mentioned, at the upper end thereof the cam or pin 13 which projects beyond a substantially conical surface 15 of the plunger or push rod 10. As long as the plunger or push rod 10 is in its vertical position as illustrated in FIG. 1, the guide rod or bar 14 of the tap-off valve 30 can bear upon this cam or pin 13. When the plunger or push rod 10 is tilted by the interrupter piston 16, the guide rod or bar 14 is first released or disengaged from the cam or pin 13 and subsequently from the conical surface 15. The plunger or push rod 10 further comprises at its lower or bottom end a substantially ball-shaped or spherical curvature or portion 44 as well as a substantially conical or cone-shaped disc or plate 45. The displaceable sleeve or sleeve member 12 already mentioned hereinbefore is pressed against this conical or cone-shaped disc or plate 45 by means of the spring 11 and is biased to pivot the plunger or push rod 10 into the vertical position thereof. The plunger or push rod 10 comprises at its lower or bottom end a recess or diametrically reduced portion 46, in order that the plunger or push rod 10 does not abut against the displaceable sleeve 12 when the plunger or push rod 10 is tilted.

Having now had the benefit of the foregoing description of the exemplary embodiment of the acceleration apparatus for connection with a pilot operated compressed-air brake, there will now be described the operation thereof which is as follows:

When the compressed-air brake is released, the air pressure in the control-air container 7a is equal to the air pressure in the main air line or conduit 6a. The piston 2 is located in the lowest or lowermost position thereof. In the chamber 20 the same air pressure prevails as in the main air line or conduit 6a, while atmospheric or barometric pressure prevails in the chambers 22, 24 and 27. The piston 16 is thus located in the end position thereof to the right. The plunger or push rod 10 is held or retained in the vertical position thereof by the spring 11. The cam or pin 13 is located below the guide rod or bar 14. The tap-off valve 30 is closed by the action of the spring 41 and both chambers or compartments 37 and 38 are vented.

During a braking operation, the pressure in the main air line or conduit 6a is lowered in the usual manner. The air pressure in the upper chamber or compartment 6 located above the piston 2 of the actuator or actuating mechanism 1 falls below the air pressure in the lower chamber or compartment 5 in which the same pressure prevails as in the control-air container 7a. The piston 2 is thus raised together with the plunger or push rod 10. The cam or pin 13 pushes the guide rod or bar 14 upwards and the valve body 32 is raised together with the guide rod or bar 14 against the action of the spring 41, thus opening the tap-off valve 30. The air from the main air line or conduit 6a flows out of the upper chamber or compartment 6 into the chamber 38 of the acceleration housing 29 and escapes to atmosphere through the throttle bore 40. An air pressure acts upon the diaphragm or membrane 35, such air pressure keeping the tap-off valve 30 open. Air flows out of the chamber 38 through the line or conduit 28 into the chamber 27 and presses against the third diaphragm or membrane 19. The air pressure acting upon this third diaphragm or membrane 19 effects a displacement of the piston 16 to the left, with the result that the plunger or push rod 10 is pivoted and the cam or pin 13 is disengaged from the guide rod or bar 14. Due to the initiation of the braking operation, a braking pressure builds up in known manner in the brake or braking cylinder 26. This braking pressure is transferred via the line or conduit 25 and the chamber 24 onto the second diaphragm or membrane 18 and holds or retains the piston 16 in the left end position thereof. The piston 16 remains in this position until the compressed-air brake is released.

While the air pressure in the main air line or conduit 6a drops or decreases by the amount required for the control or tap-off valve to respond, a pressure in the inner chamber or compartment 37 builds up by means of the throttling or throttle means 39. This pressure is supported or sustained by the force of the spring 41 such that the piston 34 is lowered and the tap-off valve or valve member 30 is closed.

During the releasing or release operation of the compressed-air brake, the pressure in the main air line or conduit 6a rises and again reaches the control pressure. The piston 2 is thus again returned to its starting position shown in FIG. 2. The brake or braking cylinder 26 is simultaneously vented and the piston 16 also returns to its starting position as shown in the drawings. The duration of the tap-off valve 30 remaining open during the braking procedure depends solely upon the predetermined or selected dimensions of the throttling means 39 and the throttle bore 40 and not, as in prior art constructions, upon the size of the acceleration chamber or compartment 38. The control of the acceleration apparatus is thus substantially simplified.

In the event that the braking operation is effected several times in succession within short time intervals, it is then possible that the compressed-air brake has not yet been totally released. In particular, this means that the piston 2 has not yet returned to the lowest or lowermost position thereof. The brake or braking cylinder 26 and thus also the chamber 24 are already vented via a line or conduit 25 and the piston 16 has already been displaced to the right in FIG. 1. The conical surface 15 is now pushed against the guide rod or bar 14. Therefore, upon repeated braking, the tap-off valve 30 is not opened by the cam or pin 13 as in the first braking operation, but rather by the conical surface 15. The guide rod or bar 14 will thus bear against the conical surface 15 more in the middle or more at the edge of the latter, depending on the position of the piston 2. The conical surface 15 ensures that the guide rod or bar 14 can be supported independent of the position of the piston 2 and thus independent of the axial position of the plunger or push rod 10 when the latter is released by the piston 16, so that a repeated opening of the tap-off valve 30 is fully ensured.

While there are shown and described present preferred embodiments of the invention, it is to be distinctly understood that the invention is not limited thereto, but may be otherwise variously embodied and practiced within the scope of the following claims.

Accordingly, what we claim is:

1. An acceleration apparatus for connection with a pilot operated compressed-air brake, particularly for railroad vehicles, comprising:
   a tap-off valve;
   a disengageable intermediary member having an operative position;
   an actuator acting via said disengageable intermediary member and serving to open said tap-off valve;
   a main air line;
   throttle means;
   a chamber connected to said main air line and vented by said throttle means;
   said disengageable intermediary member comprising a rotationally symmetrical plunger;
   a spring; and
   said rotationally symmetrical plunger being held in said operative position by means of said spring.

2. The acceleration apparatus as defined in claim 1, wherein:
   said rotationally symmetrical plunger possesses at least one end portion;
   said at least one end portion possessing a substantially ball-shaped curvature;
   said actuator having means defining a ball socket;
   said ball socket corresponding to said substantially ball-shaped curvature; and
   said rotationally symmetrical plunger with said ball-shaped curvature bearing against said ball socket of said actuator.

3. The acceleration apparatus as defined in claim 1, wherein:
   said tap-off valve comprises a guide rod;
   said rotationally symmetrical plunger possesses at least one end portion;
   said at least one end portion possessing a substantially conical surface;
   said conical surface being provided with a cam located above said conical surface and projecting from said conical surface; and
   said guide rod being located above said cam when said rotationally symmetrical plunger is engaged by said cam.

* * * * *

UNITED STATES PATENT AND TRADEMARK OFFICE
CERTIFICATE OF CORRECTION

PATENT NO. : 4,848,849

DATED : July 18, 1989

INVENTOR(S) : Niklaus Epp, et al.

It is certified that error appears in the above-identified patent and that said Letters Patent is hereby corrected as shown below:

Column 3, line 12, after "conduit" please delete "5" and insert --25--

Signed and Sealed this

Fifth Day of June, 1990

Attest:

HARRY F. MANBECK, JR.

*Attesting Officer*   *Commissioner of Patents and Trademarks*